US012052472B2

United States Patent
Li et al.

(10) Patent No.: US 12,052,472 B2
(45) Date of Patent: Jul. 30, 2024

(54) COMBINED CODEC BUFFER MANAGEMENT

(71) Applicant: Advanced Micro Devices, Inc., Santa Clara, CA (US)

(72) Inventors: Adam H. Li, San Diego, CA (US); Eugene Kuznetsov, San Diego, CA (US); Girish P. Subramaniam, Austin, TX (US); Jihyuk Choi, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/032,983

(22) Filed: Sep. 25, 2020

(65) Prior Publication Data
US 2022/0103907 A1 Mar. 31, 2022

(51) Int. Cl.
*H04N 21/472* (2011.01)
*H04N 19/42* (2014.01)
*H04N 21/2343* (2011.01)
*H04N 21/4363* (2011.01)
*H04N 21/6379* (2011.01)

(52) U.S. Cl.
CPC ....... *H04N 21/47217* (2013.01); *H04N 19/42* (2014.11); *H04N 21/234381* (2013.01); *H04N 21/43637* (2013.01); *H04N 21/6379* (2013.01)

(58) Field of Classification Search
CPC ............. H04N 21/47217; H04N 19/42; H04N 21/234381; H04N 21/43637; H04N 21/6379
See application file for complete search history.

(56) References Cited

U.S. PATENT DOCUMENTS

| | | | |
|---|---|---|---|
| 2006/0095472 A1* | 5/2006 | Krikorian | H04N 19/137 375/E7.193 |
| 2007/0223380 A1* | 9/2007 | Gilbert | H04L 47/125 370/235 |
| 2013/0308919 A1* | 11/2013 | Shaw | H04N 21/6473 386/239 |
| 2016/0295254 A1* | 10/2016 | Chen | H04N 21/23406 |
| 2019/0313122 A1* | 10/2019 | Damnjanovic | H04N 19/40 |
| 2020/0288164 A1* | 9/2020 | Lin | G06F 3/0346 |

OTHER PUBLICATIONS

Zhai, F., et al., "Joint Source-Channel Coding for Video Communications", Handbook of Image & Video Processing, Elsevier Academic Press, Boston, MA, Chapter 1, 36 pgs., 2005.

* cited by examiner

*Primary Examiner* — Girumsew Wendmagegn
(74) *Attorney, Agent, or Firm* — Volpe Koenig

(57) ABSTRACT

Techniques are provided herein for processing video data. The techniques include identifying one or more input factors including one or more of signal quality factors, video content complexity factors, and hardware buffering factors for one or more of a video encoding system and a video playback system; evaluating the one or more input factors to determine adjustments to apply to one or both of the video encoding system and the video playback system; and applying the determine adjustments to the one or both of the video encoding system and the video playback system.

20 Claims, 5 Drawing Sheets

COMBINED CODEC BUFFER MANAGEMENT

BACKGROUND

Video encoding involves analyzing and compressing video for transmission and playback of video. Video encoding and decoding is a constantly improving field.

BRIEF DESCRIPTION OF THE DRAWINGS

A more detailed understanding is gained from the following description, given by way of example in conjunction with the accompanying drawings wherein.

DETAILED DESCRIPTION

Techniques are provided herein for processing video data. The techniques include identifying one or more input factors including one or more of signal quality factors, video content complexity factors, and hardware buffering factors for one or more of a video encoding system and a video playback system; evaluating the one or more input factors to determine adjustments to apply to one or both of the video encoding system and the video playback system; and applying the determined adjustments to the one or both of the video encoding system and the video playback system.

Figure 1A:
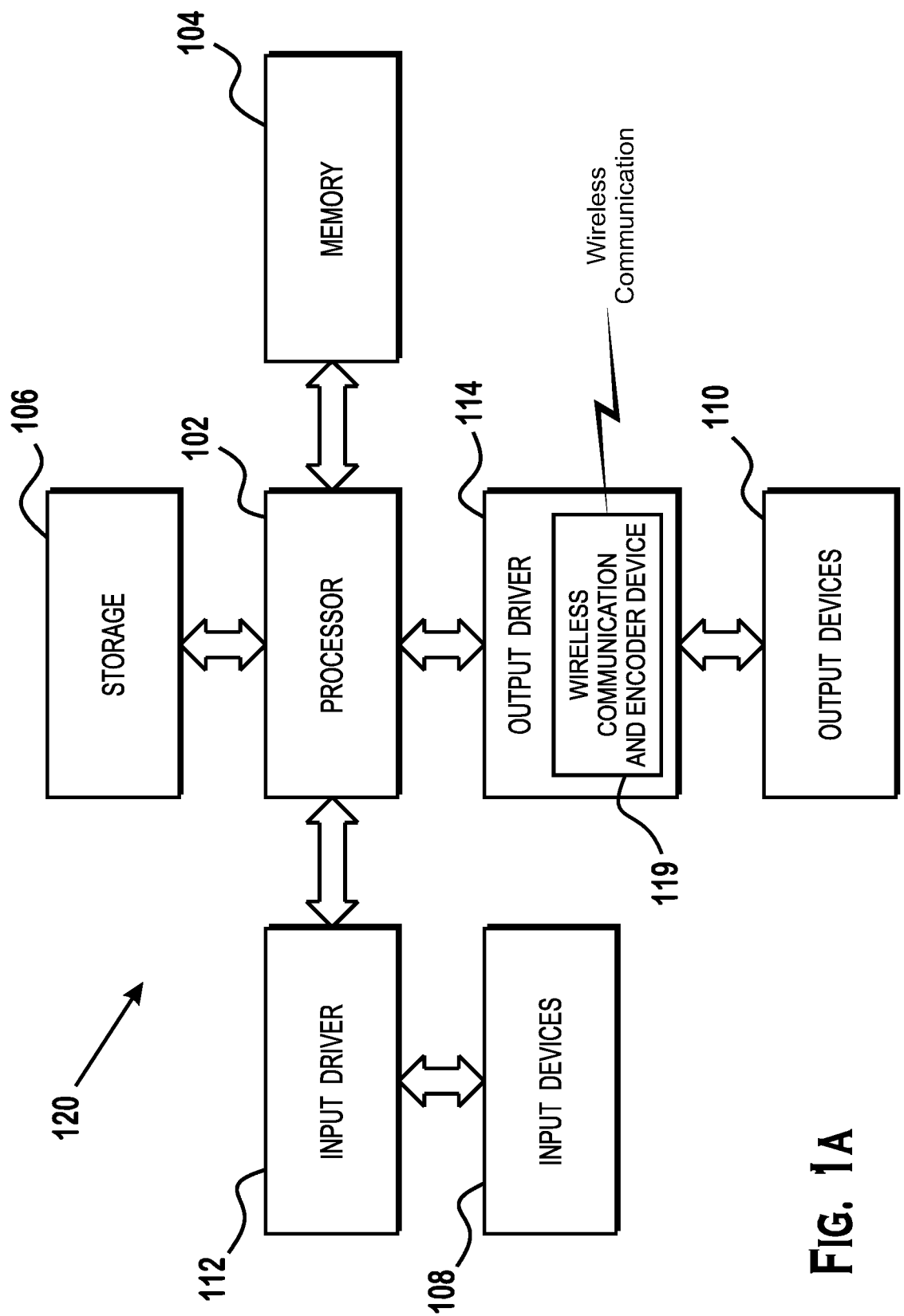
FIG. 1A is a block diagram of an example implementation of an encoder system.

FIG. 1A is a block diagram of an example implementation of an encoder system 120. The encoder system 120 includes a processor 102, a memory 104, a storage device 106, one or more input devices 108, one or more output devices 110, one or more input drivers 112, and one or more output drivers 114. It is understood that the device optionally includes additional components not shown in FIG. 1A.

The processor 102 includes one or more of: a central processing unit (CPU), a graphics processing unit (GPU), a CPU and GPU located on the same die, or one or more processor cores, wherein each processor core is a CPU or a GPU. The memory 104 is located on the same die as the processor 102 or separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

The encoder system includes a wireless communication and encoder device 119. The wireless communication and encoder device 119 includes both a device configured to wirelessly communicate with other devices and a device configured to perform video encoding. In some examples, the wireless communication device and the encoder device are incorporated on the same chip or die. In other examples, the wireless communication device is on a different chip or die as the encoder device, but is "closely coupled" with the encoder device. In an example, "closely coupled" means physically close enough to meet certain timing requirements such as time for the encoder to respond to decisions made.

The wireless communication and encoder device 119 responds to certain factors related to wireless signal integrity in order to adjust encoding settings. This adjustment is made to tailor the video encoding to the current wireless connection status. The wireless communication and encoder device 119 also considers other information such as information regarding encoder or decoder buffers and information regarding the content of the video in adjusting encoding settings. In addition, the wireless communication and encoder device 119 determines how to adjust other operating parameters, such as buffering decisions and transmission prioritization, in response to the wireless signal integrity, the information regarding content of the video, and/or the information regarding the encoder or decoder buffers.

The above features of the wireless communication and encoder device 119 allow the encoder device 119 to intelligently adjust encoding-related operating aspects to accommodate changes in wireless signal integrity. For example, the encoder device 119 is capable of increasing or decreasing encoding quality in response to an increase or decrease in signal integrity, respectively. Note that the adjustments described herein are sometimes applied very quickly, such as in less than the duration of a single frame. More complex adjustments are also possible, as described elsewhere herein.

Figure 1B:
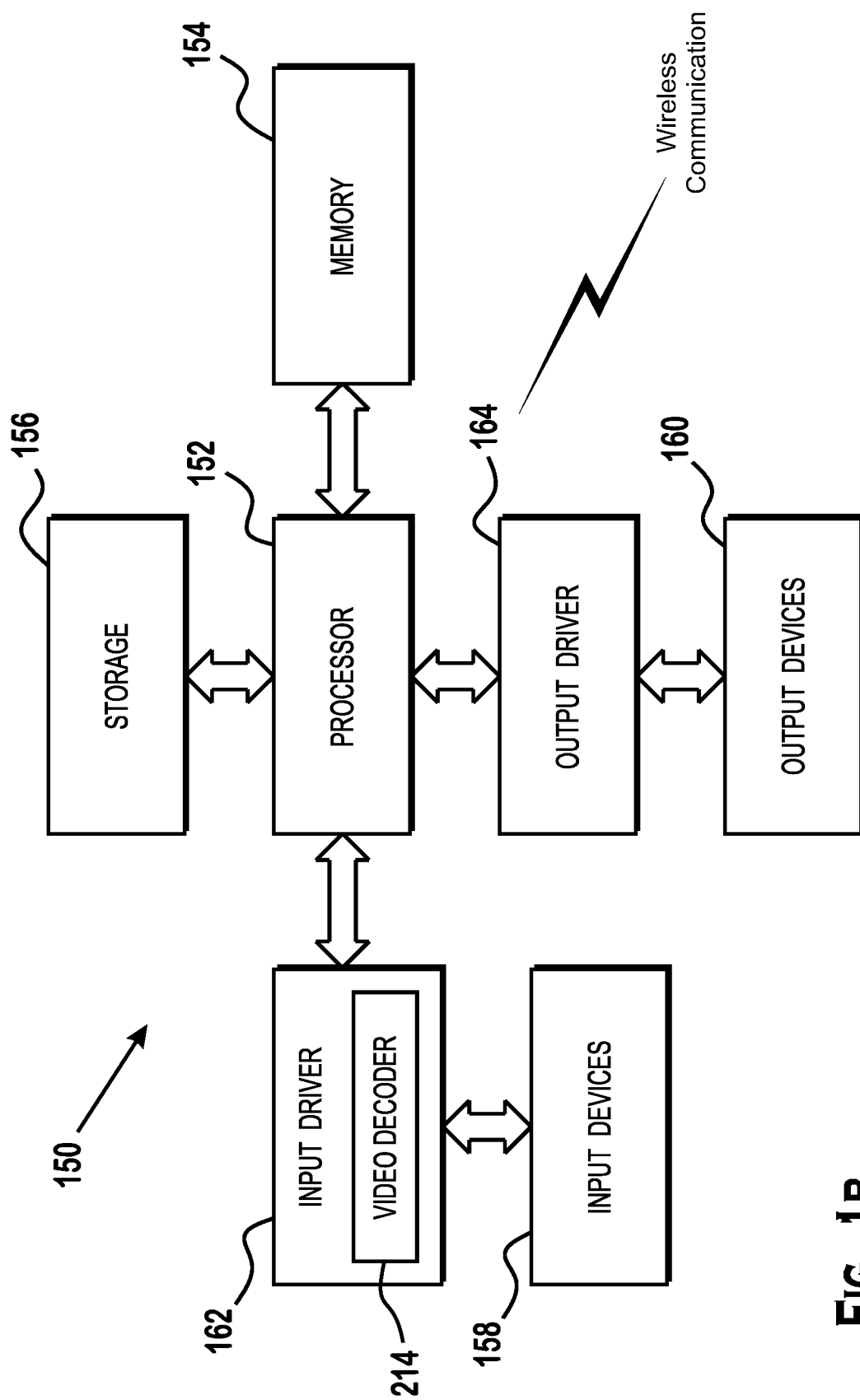
FIG. 1B is a block diagram of an example implementation of a playback system.

FIG. 1B is a block diagram of an example implementation of a playback system 150. This example implementation is similar to the example implementation of the encoder system 120, but the playback system 150 includes a video decoder 214 instead of an encoder 119. Note that the illustrated implementation is just an example of a playback system 150 that receives and decodes video content, and that in various implementations, any of a wide variety of hardware configurations are used in a playback system 150 that receives and decodes video content from the encoder system 120.

The playback system 150 includes a processor 152, a memory 154, a storage device 156, one or more input devices 158, and one or more output devices 160. The device optionally includes an input driver 162 and an output driver 164. It is understood that the device optionally includes additional components not shown in FIG. 1B.

The processor 152 includes one or more of: a central processing unit (CPU), a graphics processing unit (GPU), a CPU and GPU located on the same die, or one or more processor cores, wherein each processor core is a CPU or a GPU. The memory 154 is located on the same die as the processor 152 or separately from the processor 152. The memory 154 includes a volatile or non-volatile memory, for example, random access memory (RAM), dynamic RAM, or a cache.

The storage device 156 includes a fixed or removable storage, for example, a hard disk drive, a solid state drive, an optical disk, or a flash drive. The input devices 158 include one or more of a keyboard, a keypad, a touch screen, a touch pad, a detector, a microphone, an accelerometer, a gyroscope, or a biometric scanner. The output devices 160 include one or more of a display, a speaker, a printer, a haptic feedback device, one or more lights, or an antenna, or other input devices.

The input driver 162 communicates with the processor 152 and the input devices 158, and permits the processor 152 to receive input from the input devices 158. The output driver 164 communicates with the processor 152 and the output devices 160, and permits the processor 152 to send output to the output devices 130.

A video decoder 214 is shown. The video decoder 214 receives and decodes video for output on, for example, a display (not illustrated). In some examples, the video decoder 214 includes a transceiver (e.g., transceiver 212 in FIG. 2).

Although an encoder 119, and not a decoder, is shown in the encoder system 120 and a decoder 214, and not an encoder, is shown in the playback system 150, it should be understood that in various implementations, either or both of the encoder system 120 and the playback system 150 include both an encoder and a decoder. In other words, it is possible for a single computer system to include both an encoder 119 and a decoder 214.

Note that although some example input devices 158 and output devices 160 are described, it is possible for the decoder system 150 to include any combination of such devices, to include no such devices, or to include some such devices and other devices not listed.

In an example, the encoder system 120 is a gaming console or other computing device that renders images in real time and encodes those images for transmission. In this example, the playback system 150 is a virtual reality (VR) headset configured to receive the encoded video, decode the video for display, and display the decoded video to a user.

Figure 2:
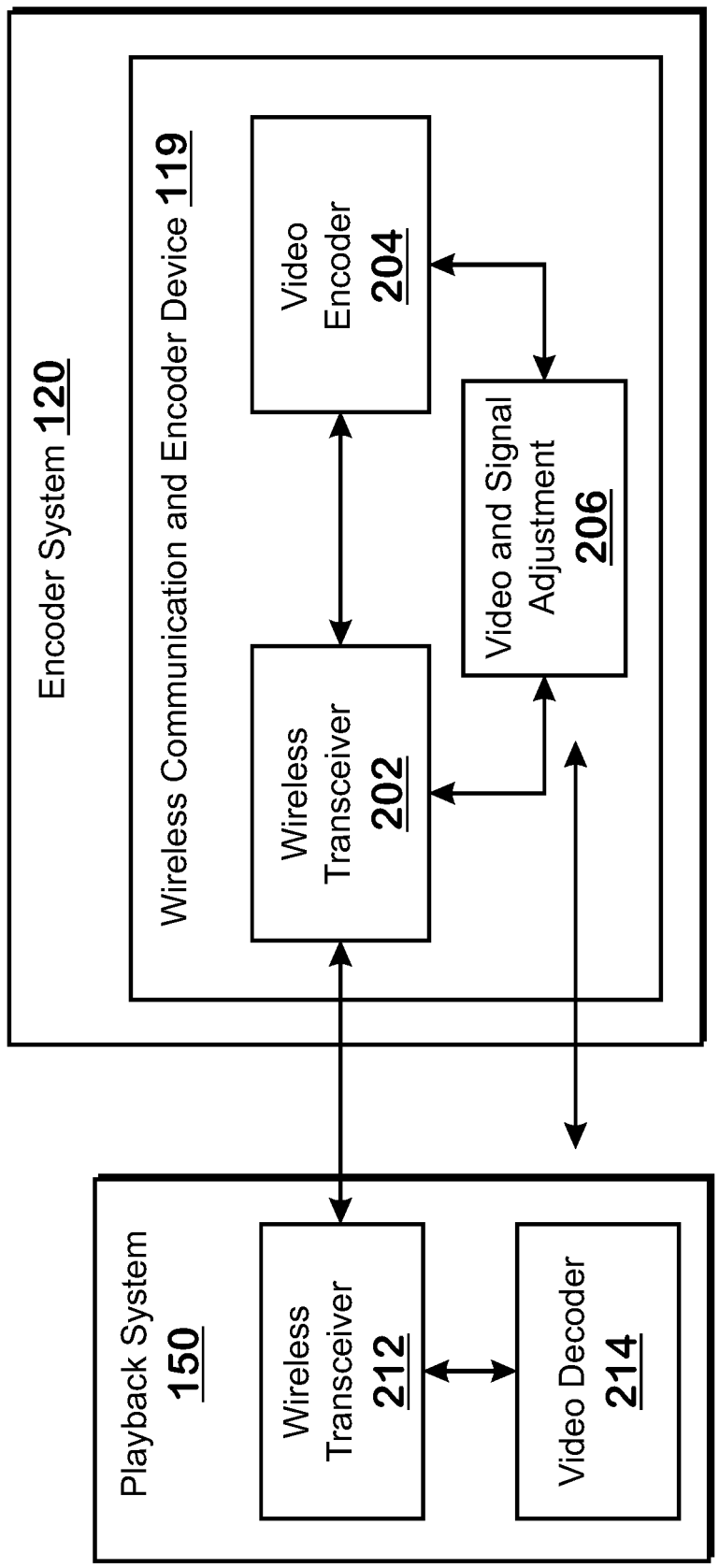
FIG. 2 is a block diagram illustrating additional detail of the playback system and the encoder system, according to an example.

FIG. 2 is a block diagram illustrating additional detail of the playback system 150 and the encoder system 120, according to an example. As described, the encoder system 120 includes a wireless communication and encoder device 119. The wireless communication and encoder device 119 includes a wireless transceiver 202 and a video encoder 204, as well as a video and signal adjustment unit 206. Any of the blocks illustrated within the wireless communication and encoder device 119 are implemented as one of hard-wired circuitry configured to perform the functionality described herein (e.g., an application specific integrated circuit ("ASIC")), software executing on a hardware processor, of a combination thereof. In some implementations, the entire wireless communication and encoder device 119 is a single integrated circuit.

The wireless transceiver 202 receives information from the playback system 150 and transmits encoded video from the video encoder 204 to the playback system 150. The video and signal adjustment unit 206 receives information from one or more of the playback system 150, the wireless transceiver 202, and the video encoder 204, and adjusts operating parameters of one or more of the playback system 150, the wireless transceiver 202, and the video encoder 204. The playback system 150 includes a wireless transceiver 212 and a video decoder 214. In some examples, the video decoder 214 includes the wireless transceiver 212.

Figure 3:
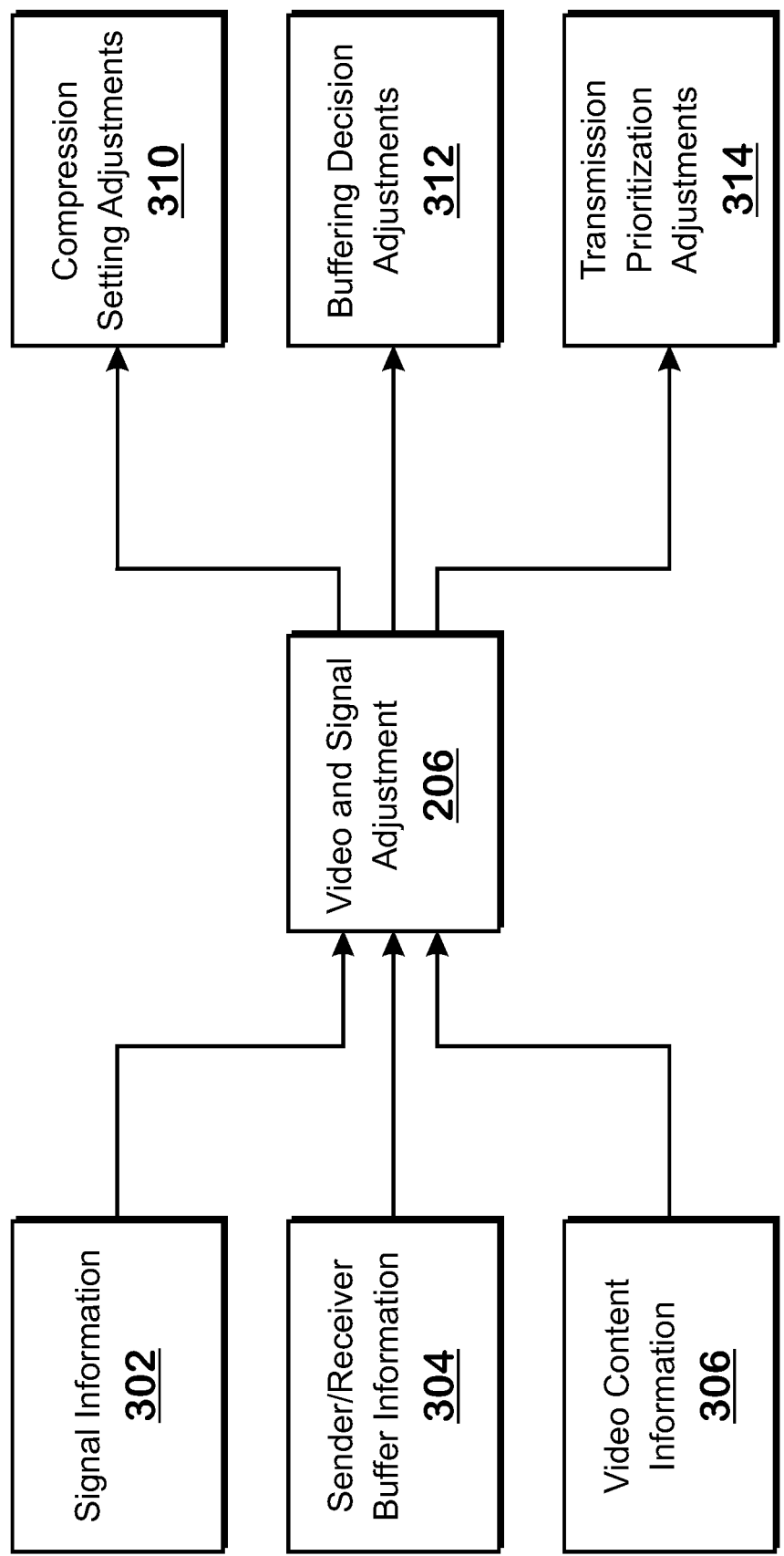
FIG. 3 is a block diagram illustrating operations of the video and signal adjustment unit, according to an example.

FIG. 3 is a block diagram illustrating operations of the video and signal adjustment unit 206, according to an example. The video and signal adjustment unit 206 accepts signal information 302 from the wireless transceiver 202 of the wireless communication and encoder device 119. The video and signal adjustment unit 206 also accepts sender and receiver buffer information 304 from the wireless transceiver 212 of the playback system 150 and the wireless transceiver 202 of the wireless communication and encoder device 119. The video and signal adjustment unit 206 also accepts video content information 306 from the video encoder 204. Based on one or more of the above information (the signal information 302, the sender/receiver buffer information 304, and the video content information 306), the video and signal adjustment unit 206 generates one or more of compression setting adjustments 310, buffering decision adjustments 312, or transmission prioritization adjustments 314.

In general, the signal information 302 includes information about the wireless connection between the playback system 150 and the encoder system 120, such as signal quality, signal throughput, and the like. In general, the sender/receiver buffer information 304 includes information about one or more buffers in one or both of the playback system 150 and the encoder system 120. Such buffers generally store information produced by one unit and waiting to be consumed by some other unit. In an example, an input buffer to the encoder 204 stores data to be encoded. In another example, an input buffer to the wireless transceiver 202 stores encoded video data waiting to be transmitted to the playback system 150. In general, the video content information 306 includes information about the content of the video that is being encoded. In examples, the video content information 306 includes compression ratios, codec settings, and other information about content compression.

In greater detail, the signal information 302 includes one or more of wireless channel signal to noise ratio ("SNR"), wireless channel modulation and coding scheme ("MCS"), wireless channel packet error rate ("PER"), and overall wireless channel throughput. The signal-to-noise ratio represents the analogue ratio of the signal to noise of the signal transmitted between the wireless transceiver 202 of the encoder system 120 and the wireless transceiver 212 of the playback system 150. The channel modulation and coding scheme indicates the manner of signal modulation, such as modulation type, coding rate, and number of spatial streams. The MCS contributes to the data transmission rate across the connection between the playback system 150 and the encoding system 120. A higher data transmission rate is associated, however, with a greater risk of data loss, and lower data rate MCS is used where interference is higher than where a higher data rate MCS is used. Wireless channel packet error rate indicates the error rate of the data transmitted across the wireless communication.

In greater detail, the sender/receiver buffer information 304 includes one or more of the buffer level of a buffer that stores data waiting to be transmitted from the encoder system 120 to the playback system 150 (a sender buffer), the buffer level of a buffer that stores data waiting to be decoded at the playback system 150 (a receiver buffer), the level of one or more encoder internal buffers of the encoder system 120, where an "internal buffer" is a hardware buffer storing data between two hardware units of the encoder system 120 for consumption by one of those two units, or the level of one or more playback internal buffers of the playback system 150. Generally, each buffer, including the sender and receiver buffers as well as the internal buffer, is associated with a "satisfactory range" that indicates the amount of data in each buffer that is considered to be satisfactory. An underflow (below the range) or overflow (above the range) is undesirable. An underflow indicates an insufficient amount of data for processing and should be avoided. An overflow indicates too much data or too low of an ability to process or transmit the data, and should also be avoided.

In greater detail, the video content information 306 includes compression setting and resulting video of one or more previous video frames (frames prior to the frame currently being encoded or transmitted), bandwidth variation of the previous frames, counter of image blocks that have reached various limits such as bandwidth limit, maximum block size limit, or the like, and "hot spots" of previous frames, where "hot spots" are portions of a frame requiring a greater-than-"normal" amount of bandwidth (for example, a complex portion of a frame may require more bits to encode than a less complex portion of the frame).

Some examples of compression settings include rate control settings, such as quantization parameters applied to whole frames or portions of frames. Quantization parameters indicate the level of compression and thus indicate a tradeoff between quality and data used for compression. The term "bandwidth variation" for previous frames refers to the total amount of data required to compress the different frames. In video compression, a rate control system typically provides a desired rate control to an encoder based on a bit budget—an amount of data intended to be consumed by a frame or portion of a frame. The actual amount of data used for a particular frame may vary, however, from the intended data. This variation is what is referred to as the bandwidth variation for frames—the actual data consumed by those frames, which is said to "vary" from a desired bandwidth. The image block limit counters include counters for a number of image blocks that have reached various limits. Some limits include total data limits for blocks. In other words, the counter counts the number of blocks that have reached a particular absolute limit in terms of compressed size. A hot spot includes a portion of a frame that requires a relatively high amount of data to encode. The amount that is considered "relatively high" can be determined in any technically feasible means. In some examples, this amount is an average data amount for the blocks in a particular frame, a weighted average, or a fixed percentage of the maximum amount of data for any particular block. In some examples, a hot spot includes a cluster of these "high data blocks." In some examples, a cluster includes a certain number of contiguous high data blocks or a certain number of high data blocks within a certain larger square or rectangle of blocks (e.g., 5 high data blocks in a rectangle of 12 blocks).

The video and signal adjustment unit 206 uses the above information to determine codec compression settings adjustments 310, buffering decision adjustments 312, and transmission prioritization adjustments 314. Codec compression settings include bandwidth and compression settings, error resilience settings, and foveated encoding settings (where foveated encoding settings represent a mapping for a screen regarding how much of a bit budget to allocate to different portions of the screen). Buffering decisions include whether to drop late packets, whether to drop packets when one or more buffers are full, and whether to insert data into a stream when there is packet loss. Transmission prioritization includes whether and what to prioritize transmission for and how many times to retransmit certain items of data.

There are many ways in which the video and signal adjustment unit 206 is capable of adjusting the compression setting adjustments 310, buffering decision adjustments 312, and transmission prioritization adjustments 314 based on the input information. In general, the video and signal adjustment unit 206 reduces the amount of data that is necessary to be transmitted in response to a detection of a reduction in the capacity to transmit data and have that data decoded at an appropriate speed by the playback system 150.

More specifically, the video and signal adjustment unit 206 determines or predicts an amount of data that is needed to be transmitted (video content information 306) and, based on the signal quality (signal information 302) and the ability of the encoder system 120 and playback system 150 to transmit and process that data (buffer levels 304), adjusts the quality of the video (compression setting adjustments 310), and buffering 312 and transmission priority settings 314 accordingly. In various examples, the manner in which the input information (302-306) affects the settings adjustments (310-314) include the following. In response to the signal quality degrading, the video and signal adjustment unit 206 reduces the amount of data necessary for transmission. In response to the signal quality improving, the video and signal adjustment unit 206 increases the amount of data necessary for transmission. In response to one or more buffers becoming too full, the video and signal adjustment unit 206 reduces the amount of data necessary for transmission. In response to one or more buffers becoming too empty, the video and signal adjustment unit 206 increases the amount of data necessary for transmission. In response to the predicted data requirements (video content information 306) indicating that the data requirements are lower, the video and signal adjustment unit 206 increases the amount of data necessary for transmission. In response to the predicted data requirements indicating that data requirements are higher, the video and signal adjustment unit 206 decreases the amount of data necessary for transmission. It is possible that one or more input factors indicate that the amount of data for transmission should increase and that one or more other input factors indicate that the amount of data for transmission should decrease. In this instance, the video and signal adjustment unit 206 performs a quantitative analysis to determine whether and how to adjust the various settings (310-314). In an example, the signal quality (302) improves, and thus more data is available, but the video content information 306 indicates that the complexity of the video is increasing and thus requires more data. In this situation, the video and signal adjustment unit 206 determines whether to increase or decrease the amount of data required based on a comparison of the degree to which the complexity of the video content is increasing to the degree to which the signal quality improves.

Increasing the amount of data required for transmission includes one or more of adjusting compression settings (e.g., rate control, error resilience, foveated encoding strength) upwards to improve quality of the video and increase amount of data necessary, modifying buffering settings to require more data, such as by dropping fewer packets and inserting less data for dropped packets, to increase amount of data necessary, and modifying transmission prioritization to require a greater amount of data, such as by increasing the number of times of retransmission or modifying prioritization settings such that certain portions of data that would be prioritized before such modification are not prioritized as strongly as compared with other portions of data.

Decreasing the amount of data required for transmission includes one or more of adjusting compression settings downward, modifying buffering settings to require less data, such as by dropping more packets and inserting more data for dropped packets, and modifying transmission prioritization to require a smaller amount of data, such as by decreasing the number of times of retransmission or modifying prioritization settings such that certain portions of data deemed "important" (e.g., perceptually important) have a greater priority than other portions.

Figure 4:
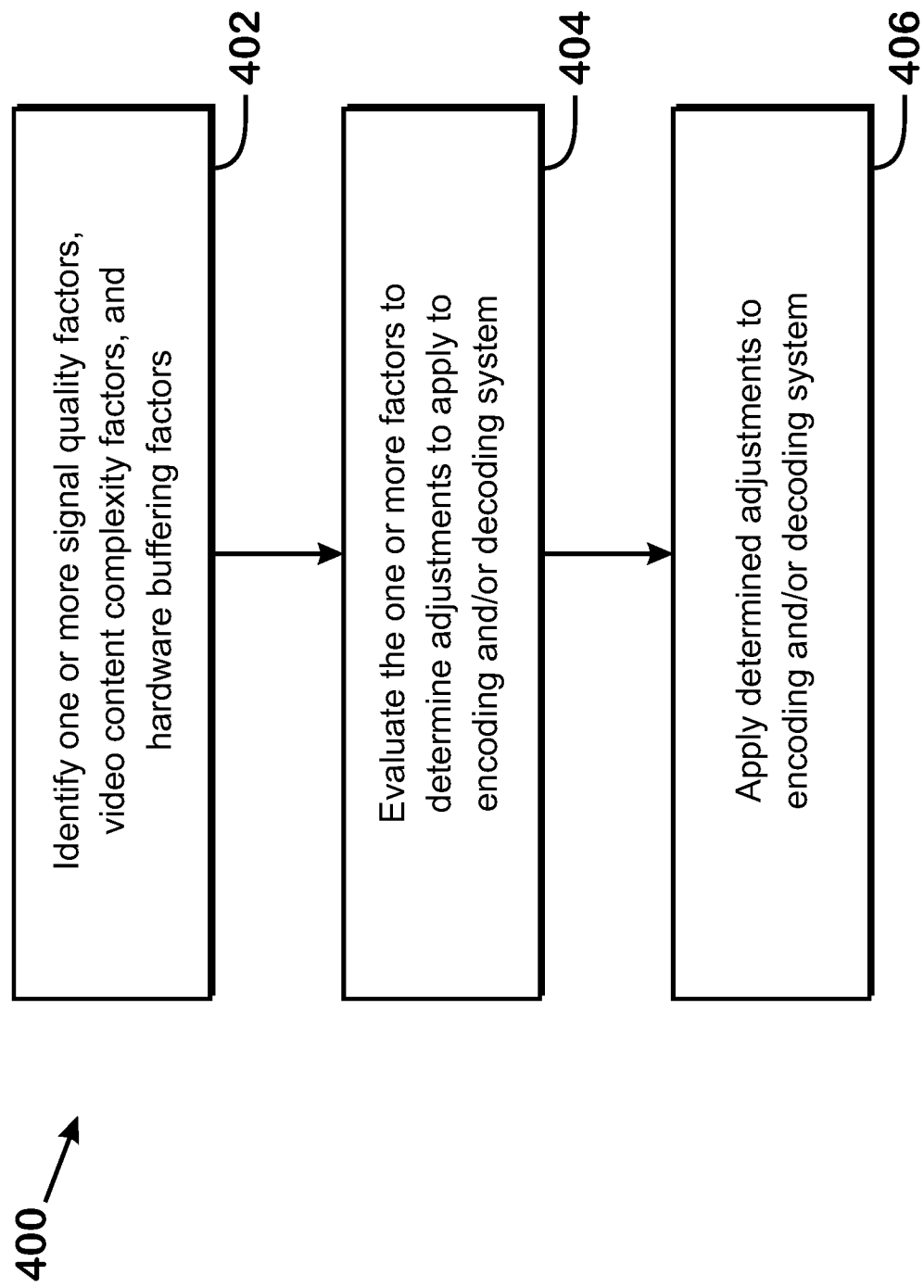
FIG. 4 is a flow diagram of a method for operating an encoder system, according to an example.

FIG. 4 is a flow diagram of a method 400 for operating an encoder system 120, according to an example. Although described with respect to the system of FIGS. 1A-3, those of skill in the art will understand that any system, configured to perform the steps of the method 400 in any technically feasible order, falls within the scope of the present disclosure.

At step 402, a video and signal adjustment unit 206 identifies one or more signal quality factors (signal information 302), video content complexity factors (video content information 306), and hardware buffering factors (sender/receiver buffer information 304). The present disclosure identifies a large number of such factors, but the present disclosure is not limited to such factors.

At step 404, the video and signal adjustment unit 206 evaluates the one or more input factors to determine adjustments to apply to an encoding system 120 and/or a decoding system 150. In general, input factors that indicate that more data should be used by the video results in the video and signal adjustment unit 206 adjusting various factors to use more data, as described herein. Input factors that indicate that less data should be used by the video results in the video and signal adjustment unit 206 adjusting various factors to use less data, as described herein. Input factors that conflict with other input factors result in the video and signal adjustment unit 206 analyzing those input factors quantitatively to determine which adjustments to make.

At step 406, the video and signal adjustment unit applies the adjustments to the encoding system 120 and/or decoding system 150. As described in more detail herein, the various adjustments include one or more of compression setting adjustments 310, buffering decision adjustments 312, and transmission prioritization adjustments 314.

It should be understood that many variations are possible based on the disclosure herein. Although features and elements are described above in particular combinations, in various implementations, each feature or element is used alone without the other features and elements or in various combinations with or without other features and elements.

The various functional units illustrated in the figures and/or described herein (including, but not limited to, the processor 102, the input driver 112, the input devices 108, the output driver 114, the output devices 110, the encoder system 120 or the playback system 150 or any of the blocks thereof, are, in various implementations, implemented as a general purpose computer, a processor, or a processor core, or as a program, software, or firmware, stored in a non-transitory computer readable medium or in another medium, executable by a general purpose computer, a processor, or a processor core. The methods provided are, in various implementations, implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors are, in various implementations, manufactured by configuring a manufacturing process using the results of processed hardware description language (HDL) instructions and other intermediary data including netlists (such instructions capable of being stored on a computer readable media). The results of such processing include maskworks that are then used in a semiconductor manufacturing process to manufacture a processor which implements aspects of the embodiments.

In various implementations, the methods or flow charts provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing video data, comprising:
evaluating a plurality of input factors to determine adjustments to apply to codec compression settings that are used by one or both of a video encoding system and a video playback system, to determine adjustments to buffering decisions, and to determine transmission prioritization adjustments, wherein the plurality of input factors includes signal quality factors, video content complexity factors, and hardware buffering factors; and
applying the determined adjustments to the codec compression settings that are used by the one or both of the video encoding system and the video playback system, wherein the adjustments are applied in less than a duration of a single frame.

2. The method of claim 1, wherein the signal quality factors include one or more of signal-to-noise ratio, wireless channel modulation and coding scheme, wireless channel packet error rate, and overall wireless channel throughput.

3. The method of claim 1, wherein the video content complexity factors include one or more of compression settings, bandwidth variations, image block limit counters, and block hot spots of previous frames.

4. The method of claim 1, wherein the hardware buffering factors include one or more of buffer level of a buffer that stores data waiting to be transmitted from the video encoding system to the video playback system, one or more of a buffer level of a buffer that stores data waiting to be decoded at the video playback system, one or more of a buffer level of an internal buffer that is internal to the video playback system, one or more of a buffer level of an internal buffer that is internal to the video encoder system.

5. The method of claim 1, wherein the adjustments include one or more of codec compression settings adjustments, buffering decision adjustments, and transmission prioritization adjustments.

6. The method of claim 5, wherein the codec compression adjustments include one or more of bandwidth and compression settings adjustments, error resilience settings, and foveated encoding settings.

7. The method of claim 5, wherein the buffering decision adjustments include one or more of whether to drop late packets, whether to drop packets when one or more buffers are full, and whether to insert data into a stream when there is packet loss.

8. The method of claim 5, wherein the transmission prioritization adjustments include one or more of whether and what to prioritize for transmission for and how many times to retransmit certain items of data.

9. The method of claim 1, wherein determining the adjustments includes determining adjustments that increase or decrease data needed for transmission in response to factors that indicate an increase or decrease in availability of data transmission or processing capabilities.

10. The method of claim 1, wherein the input factors are received from one or more of the video encoding system and the playback system.

11. A video encoding system, comprising:
a wireless transceiver;
a video encoder; and
a video and signal adjustment unit configured to:
evaluate a plurality of input factors to determine adjustments to apply to codec compression settings that are used by one or both of the video encoder and a video playback system, to determine adjustments to buffering decisions, and to determine transmission prioritization adjustments, wherein the plurality of input factors includes signal quality factors, video content complexity factors, and hardware buffering factors; and
apply the determined adjustments to the codec compression settings that are used by the one or both of the video encoding system and the video playback system, wherein the adjustments are applied in less than a duration of a single frame.

12. The video encoding system of claim 11, wherein the signal quality factors include one or more of signal-to-noise ratio, wireless channel modulation and coding scheme, wireless channel packet error rate, and overall wireless channel throughput.

13. The video encoding system of claim 11, wherein the video content complexity factors include one or more of compression settings, bandwidth variations, image block limit counters, and block hot spots of previous frames.

14. The video encoding system of claim 11, wherein the hardware buffering factors include one or more of buffer level of a buffer that stores data waiting to be transmitted from the video encoder to the video playback system, one or more of a buffer level of a buffer that stores data waiting to be decoded at the video playback system, one or more of a buffer level of an internal buffer that is internal to the video playback system, one or more of a buffer level of an internal buffer that is internal to the video encoder system.

15. The video encoding system of claim 11, wherein the adjustments include one or more of codec compression settings adjustments, buffering decision adjustments, and transmission prioritization adjustments.

16. The video encoding system of claim 15, wherein the codec compression adjustments include one or more of bandwidth and compression settings adjustments, error resilience settings, and foveated encoding settings.

17. The video encoding system of claim 15, wherein the buffering decision adjustments include one or more of whether to drop late packets, whether to drop packets when one or more buffers are full, and whether to insert data into a stream when there is packet loss.

18. The video encoding system of claim 15, wherein the transmission prioritization adjustments include one or more of whether and what to prioritize for transmission for and how many times to retransmit certain items of data.

19. The video encoding system of claim 11, wherein determining the adjustments includes determining adjustments that increase or decrease data needed for transmission in response to factors that indicate an increase or decrease in availability of data transmission or processing capabilities.

20. A system, comprising:
a video playback system; and
a video encoding system, comprising:
a wireless transceiver;
a video encoder; and
a video and signal adjustment unit configured to:
evaluate a plurality of input factors to determine adjustments to apply to codec compression settings that are used by one or both of the video encoding system and the video playback system, to determine adjustments to buffering decisions, and to determine transmission prioritization adjustments, wherein the plurality of input factors includes signal quality factors, video content complexity factors, and hardware buffering factors; and
apply the determined adjustments to the codec compression settings that are used by the one or both of the video encoding system and the video playback system, wherein the adjustments are applied in less than a duration of a single frame.

* * * * *